United States Patent
Ramkumar et al.

(10) Patent No.: US 10,028,249 B2
(45) Date of Patent: Jul. 17, 2018

(54) TECHNIQUES AND APPARATUSES FOR CO-OPERATIVE TRAFFIC MANAGEMENT USING COMBINED PAGING CYCLE FOR USER EQUIPMENTS

(71) Applicant: QUALCOMM Incorporated, San Diego, CA (US)

(72) Inventors: Vasanth Kumar Ramkumar, San Diego, CA (US); Srinivasan Balasubramanian, San Diego, CA (US); Arvind Santhanam, San Diego, CA (US); Ramachandran Subramanian, San Diego, CA (US); Muhammad Imran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/380,810

(22) Filed: Dec. 15, 2016

(65) Prior Publication Data

US 2018/0176882 A1    Jun. 21, 2018

(51) Int. Cl.
*H04W 68/02* (2009.01)
*H04W 4/08* (2009.01)
(Continued)

(52) U.S. Cl.
CPC .............. *H04W 68/02* (2013.01); *H04W 4/08* (2013.01); *H04W 88/02* (2013.01); *H04W 88/08* (2013.01)

(58) Field of Classification Search
CPC ... H04W 68/02; H04W 68/025; H04W 84/02; H04W 84/027; H04W 84/042;
(Continued)

(56) References Cited

U.S. PATENT DOCUMENTS 9,271,255 B1    2/2016  Jones
9,402,277 B2    7/2016  Soliman et al.
(Continued)

OTHER PUBLICATIONS

3rd Generation Partnership Project; Technical Specification Group Radio Access Network; Study on Further Enhancements to LTE Device to Device (D2D), User Equipment (UE) to Network Relays for Internet of Things (IoT) and Wearables; (Release 14), 3GPP Standard; 3GPP TR 36.746, 3rd Generation Partnership Project (3GPP), Mobile Competence Centre, 650, Route Des Lucioles, F-06921 Sophia-Antipolis Cedex, France, vol. RAN WG2, No. V0.3.0, Oct. 31, 2016, pp. 1-11, XP051173185, [retrieved on Oct. 31, 2016].

(Continued)

*Primary Examiner* — Meless Zewdu
(74) *Attorney, Agent, or Firm* — Harrity & Harrity, LLP

(57) ABSTRACT

A person may utilize multiple connected devices, such as smart watches, user equipments (UEs), smartphones, tablet computers, and/or the like, which may each be assigned unique phone numbers. Operators may assign a common phone number to the multiple connected devices; however, the phone number is not used in the access stratum path of a radio access technology resulting in multiple paging procedures being performed for the multiple connected devices. In implementations, described herein, a first UE, such as a smartphone, may obtain paging information associated with decoding paging messages for a second UE, such as a smart watch. The first UE may use the paging information to decode a paging message of a combined paging cycle established for the first UE and the second UE, thereby obviating a need for multiple paging cycles for the first UE and the second UE.

30 Claims, 10 Drawing Sheets

(51) Int. Cl.
*H04W 88/02* (2009.01)
*H04W 88/08* (2009.01)

(58) Field of Classification Search
CPC ............ H04W 84/045; H04W 84/047; H04W 52/0219; H04W 52/0209; H04W 88/02; H04W 4/02; H04W 4/12; H04W 4/14; H04W 4/18; H04W 74/08; H04W 4/08; H04W 88/08; H04W 84/04; H04W 52/383; H04W 76/14; H04W 76/23; H04W 74/04; H04W 72/0446; H04W 4/70; H04W 4/80; Y02D 70/21; Y02D 70/22; Y02D 70/26
See application file for complete search history.

(56) References Cited

U.S. PATENT DOCUMENTS

| | | | | |
|---|---|---|---|---|
| 2005/0172199 | A1* | 8/2005 | Miller | H04L 1/08 714/749 |
| 2006/0222010 | A1* | 10/2006 | Bosch | H04L 1/1854 370/469 |
| 2013/0028184 | A1* | 1/2013 | Lee | H04W 8/22 370/328 |
| 2013/0265906 | A1* | 10/2013 | Abraham | H04W 40/246 370/254 |
| 2014/0022986 | A1* | 1/2014 | Wu | H04W 48/16 370/328 |
| 2014/0192659 | A1* | 7/2014 | Tian | H04W 72/0453 370/252 |
| 2014/0256365 | A1 | 9/2014 | Schmidt et al. | |
| 2015/0065106 | A1* | 3/2015 | Catovic | H04W 8/22 455/418 |
| 2016/0073349 | A1* | 3/2016 | Mohan | H04W 52/0251 455/426.1 |
| 2016/0135141 | A1* | 5/2016 | Burbidge | H04W 68/02 455/458 |
| 2016/0142898 | A1* | 5/2016 | Poitau | H04W 72/0413 370/329 |
| 2016/0142974 | A1* | 5/2016 | Lindoff | H04B 1/40 370/311 |
| 2016/0227463 | A1 | 8/2016 | Baligh et al. | |
| 2016/0269994 | A1 | 9/2016 | Pocha et al. | |
| 2017/0134573 | A1* | 5/2017 | Lau | H04M 3/42382 |
| 2017/0257898 | A1* | 9/2017 | Maaref | H04W 4/08 |

OTHER PUBLICATIONS

International Search Report and Written Opinion—PCT/US2017/061119—ISA/EPO—dated Feb. 14, 2018.

Sequans Communications: "Idle Mode Procedures for feD2D", 3GPP Draft; R2-168623, 3rd Generation Partnership Project. (3GPP), Mobile Competence Centre, 650, Route Des Lucioles, F-06921 Sophia-Antipolis Cedex, France, vol. RAN WG2, No. Reno. USA; Nov. 13, 2016, XP051178187, Retrieved from the Internet: URL:http://www.3gpp.org/ftp/Meetings_3GPP_SYNC/RAN2/Docs/ [retrieved on Nov. 13, 2016], 4 pages.

Sony: "Paging Via Relay", 3GPP Draft; R2-168547 FED2D Paging, 3rd Generation Partnership Project (3GPP), Mobile Competence Centre, 650, Route Des Lucioles, F-06921 Sophia-Antipolis Cedex, France, vol. RAN WG2, No. Reno, USA; Nov. 13, 2016, XP051178122, Retrieved from the Internet: URL:http://www.3gpp.org/ftp/Meetings_3GPP_SYNC/RAN2/Docs/ [retrieved on Nov. 13, 2016], 4 pages.

ZTE: "Discussion on the Pairing, Paging and System Info Acquisition of Remote UE", 3GPP Draft; R2-168170, 3rd Generation Partnership Project (3GPP), Mobile Competence Centre, 650, Route Des Lucioles, F-06921 Sophia-Antipolis Cedex, France, vol. RAN WG2, No. Reno, USA; Nov. 13, 2016, XP051177844, Retrieved from the Internet: URL:http://www.3gpp.org/ftp/Meetings_3GPP_SYNC/RAN2/Docs/ [retrieved on Nov. 13, 2016], 6 pages.

* cited by examiner

TECHNIQUES AND APPARATUSES FOR CO-OPERATIVE TRAFFIC MANAGEMENT USING COMBINED PAGING CYCLE FOR USER EQUIPMENTS

BACKGROUND

Field

The present disclosure relates generally to communication systems, and more particularly, to techniques for co-operative traffic management.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Multiple wireless communication devices, such as user equipments (UEs), smartphones, tablet computers, wearable devices, and/or the like may be assigned unique phone numbers despite being operated by the same entity (e.g., a single person, a single business, and/or the like). To enable the multiple communication devices to remain synchronized with regard to some features, operators may assign a common mobile station international subscriber directory number (MSISDN) (i.e., a common phone number) to the multiple communication devices, instead. For example, a user may utilize a first UE and a second UE that share a common phone number. However, the MSISDN is not utilized in the access stratum path of a radio access technology (RAT). Instead, an international mobile subscriber identity (IMSI) or a serving temporary mobile subscriber identity (S-TMSI) is used at the access stratum path.

An operator may maintain a routing table identifying an MSISDN and a group of associated IMSIs or S-TMSIs. This may permit the operator to maintain feature synchronization for the multiple wireless communication devices used by the same entity. As a result of the multiple IMSIs or S-TMSIs for the multiple wireless communication devices, the operator may perform individual paging procedures directed at each wireless communication device.

To perform multiple paging procedures directed at multiple wireless communication devices, the network may attempt a sequential paging procedure or a parallel paging procedure. In the sequential paging procedure, the network may perform a first paging procedure for the first UE followed by a second paging procedure for the second UE. This may result in a delay in page decoding for pages intended for the common MSISDN as the network iteratively pages each of the multiple wireless communication devices. In the parallel paging procedure, the first paging procedure and the second paging procedure are performed concurrently, which may result in excessive utilization of network resources. Thus, it may be beneficial to perform co-operative traffic management for paging cycles and/or other network traffic common to the single entity.

SUMMARY

Aspects described herein may decode a paging message associated with a combined paging cycle. The combined paging cycle may be established by a network for a first user equipment (UE) and a second UE. The paging message may be decoded by the first UE using paging information obtained by the first UE and associated with decoding paging messages for the second UE. Thus, an amount of time to decode a paging message intended for a single entity associated with the first UE and the second UE is reduced and/or an amount of network traffic generated to perform paging for the single entity is reduced relative to a parallel technique for paging multiple UEs.

In an aspect of the disclosure, a method, a device, an apparatus, and a computer program product are provided.

In some aspects, the method may include obtaining, by a first UE, paging information associated with decoding paging messages for a second UE. The paging information may identify a combined paging cycle established by a network for the first UE and the second UE. The method may include decoding, by the first UE, a paging message associated with the combined paging cycle.

In some aspects, the device may include memory and one or more processors coupled to the memory. The memory and the one or more processors may be configured to obtain paging information associated with decoding paging messages for another device. The paging information may identify a combined paging cycle established by a network for the device and the other device. The memory and the one or more processors may be configured to decode a paging message associated with the combined paging cycle.

In some aspects, the apparatus may include means for obtaining paging information associated with decoding paging messages for another apparatus. The paging information may identify a combined paging cycle established by a network for the apparatus and the other apparatus. The apparatus may include means for decoding a paging message associated with the combined paging cycle.

In some aspects, the computer program product may include a non-transitory computer-readable medium storing one or more instructions for wireless communication that, when executed by one or more processors of a device, cause the one or more processors to obtain paging information associated with decoding paging messages for another device. The paging information may identify a combined paging cycle established by a network for the device and the other device. The one or more instructions may cause the one or more processors to decode a paging message associated with the combined paging cycle.

DETAILED DESCRIPTION

Figure 1:
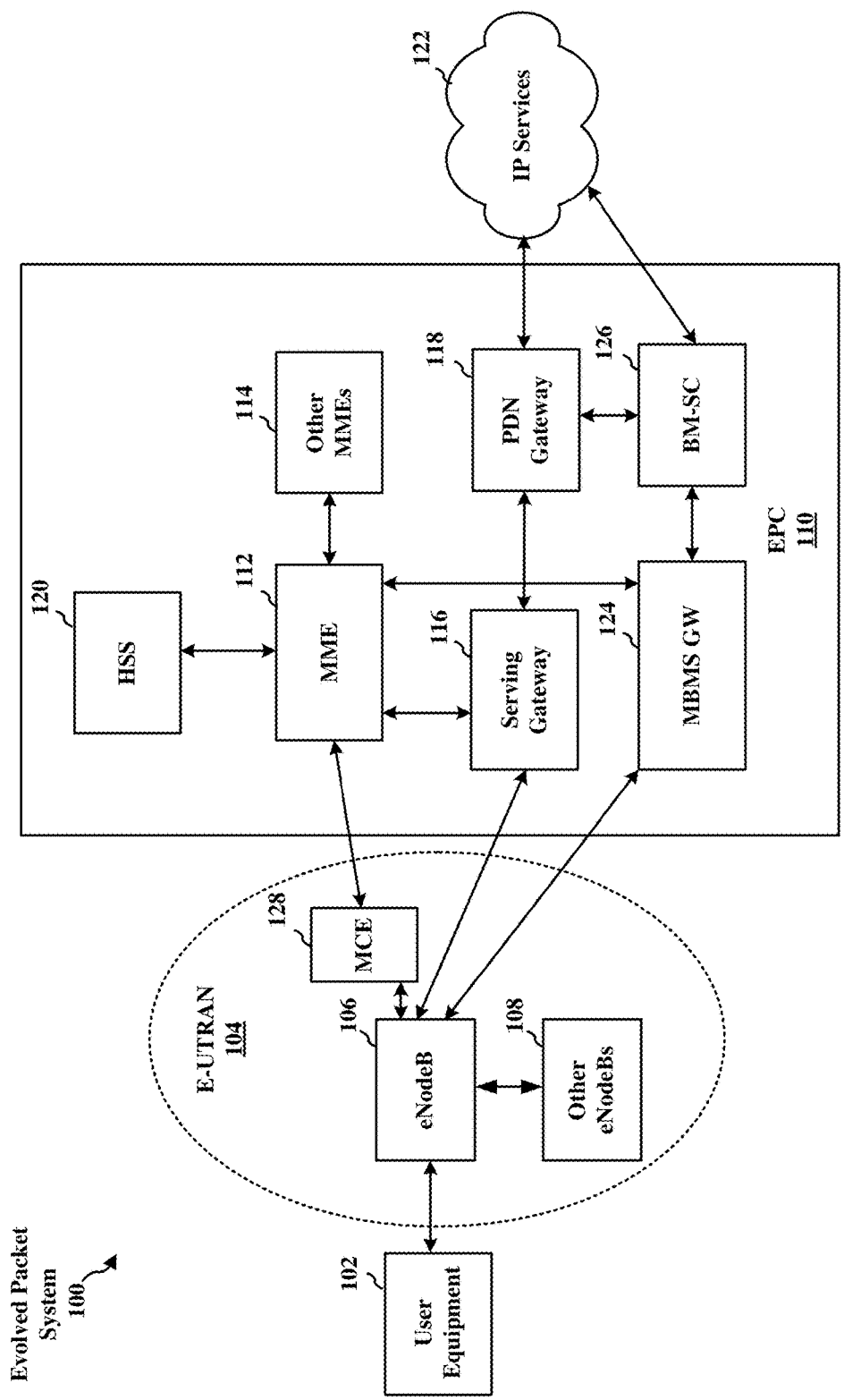
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The eNB 106 provides paging messages to the UE 102, and may establish a combined paging cycle for multiple UEs 102. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. Additionally, or alternatively, UE 102 may include a handheld device, a hand-worn device (e.g., a smart wristwatch, a health monitor, and/or the like), another type of body-worn device (e.g., a pair of smart eyeglasses, a pulse monitor, and/or the like), an Internet of Things (IoT) device, and/or the like. A UE 102, as described herein, may decode a paging message associated with a combined paging cycle established for the UE 102 and another UE 102. A UE 102, as described herein, may relay network traffic for another UE 102.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
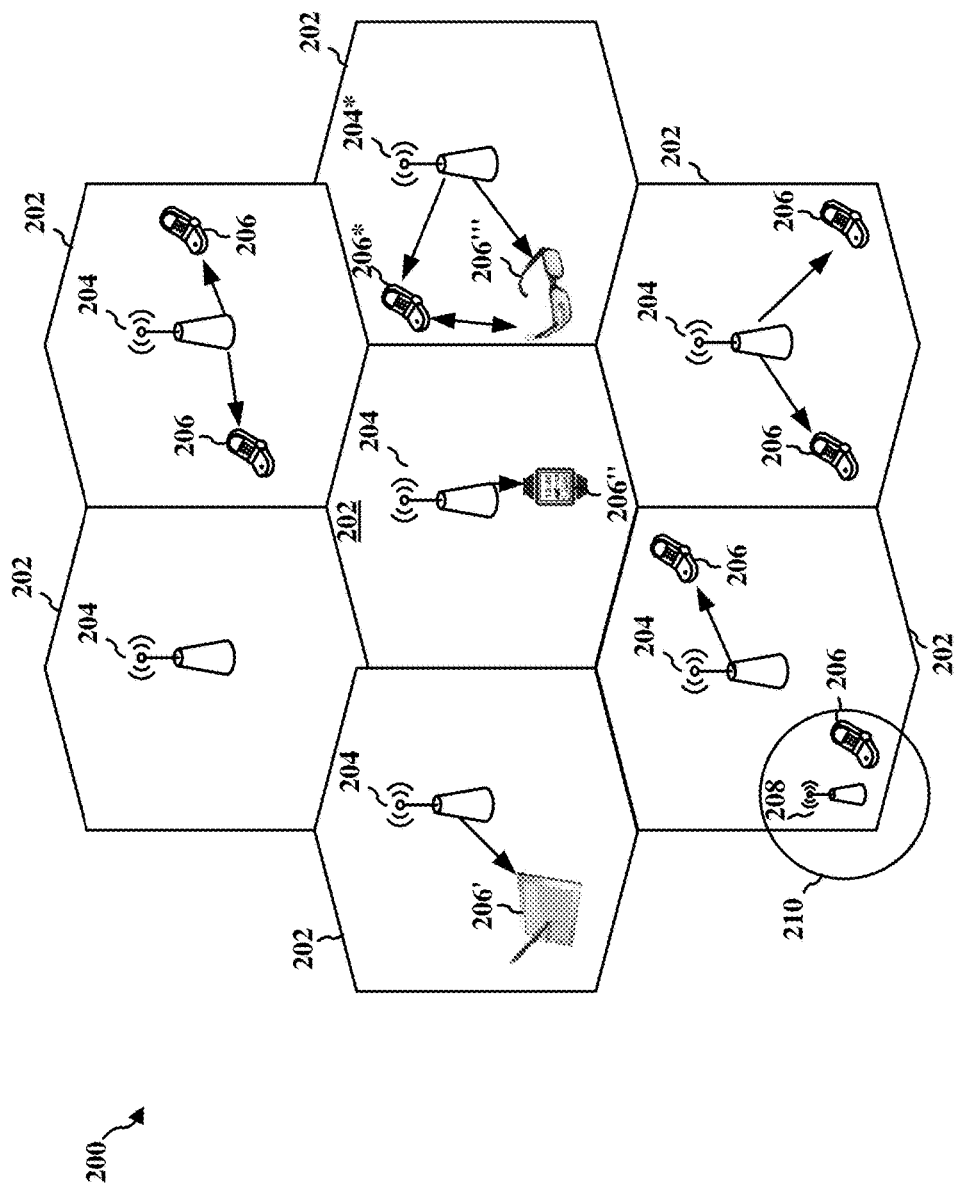
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream. The UEs 206 may include multiple types of UEs 206, such as smartphones (e.g., UE 206*), tablet computers (e.g., UE 206'), smartwatches (e.g., UE 206"), connected eyeglasses (e.g., UE 206'''), and/or the like. In some aspects, a first UE 206 may communicate with a second UE 206 to share paging messages. For example, as shown, UE 206* may communicate with UE 206''' to relay paging messages to UE 206''', to relay UL traffic to eNB 204*, and/or the like.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity. Furthermore, the UE(s) 206 may selectively perform various advanced receiver operations to improve downlink performance when channel conditions are unfavorable, as described in more detail elsewhere herein.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
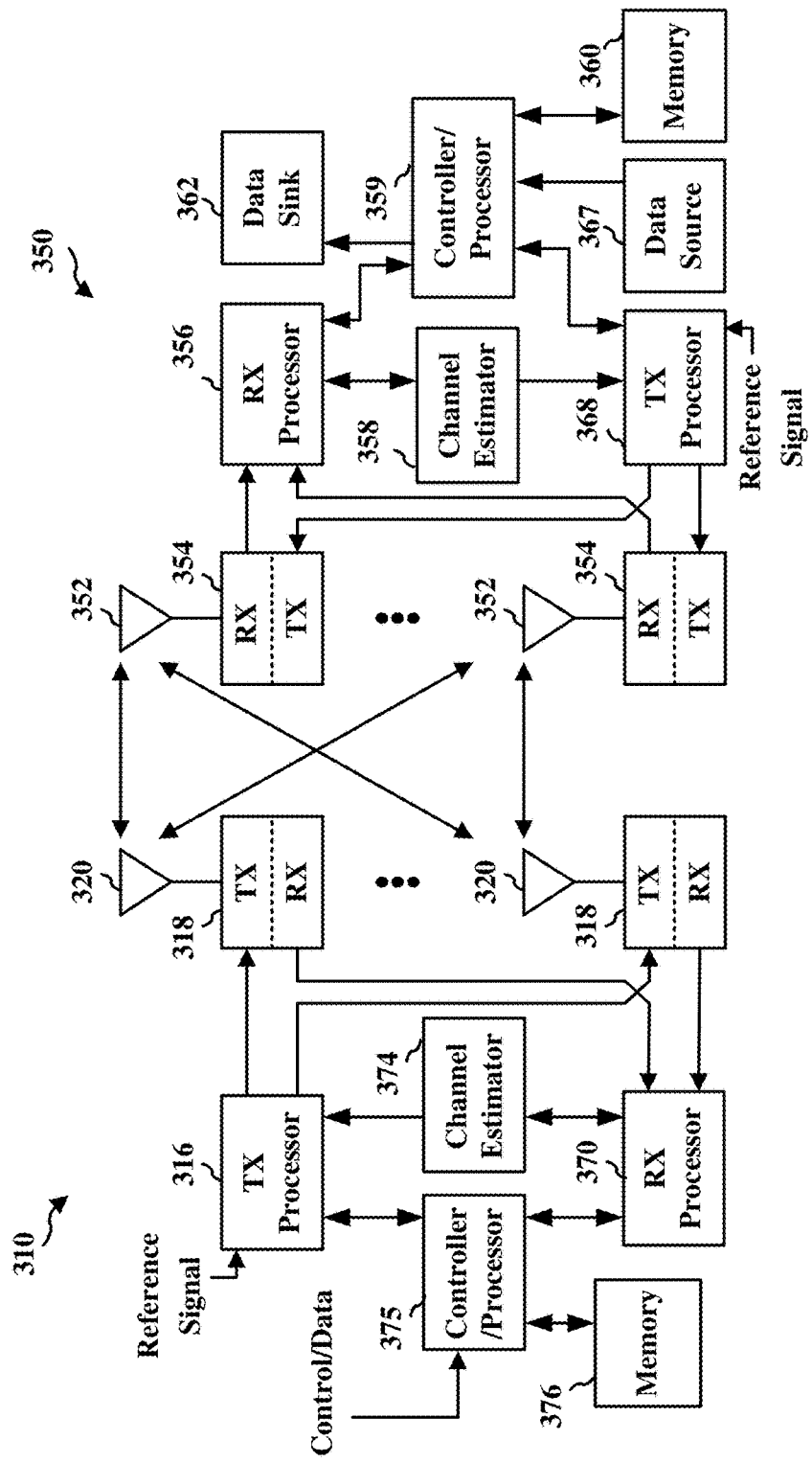
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based at least in part on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions include coding and interleaving to facilitate forward error correction (FEC) at the UE 350 and mapping to signal constellations based at least in part on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. For example, RX processor 356 may use paging information to receive a paging message at UE 350 and intended for another UE 350. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based at least in part on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based at least in part on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4A:
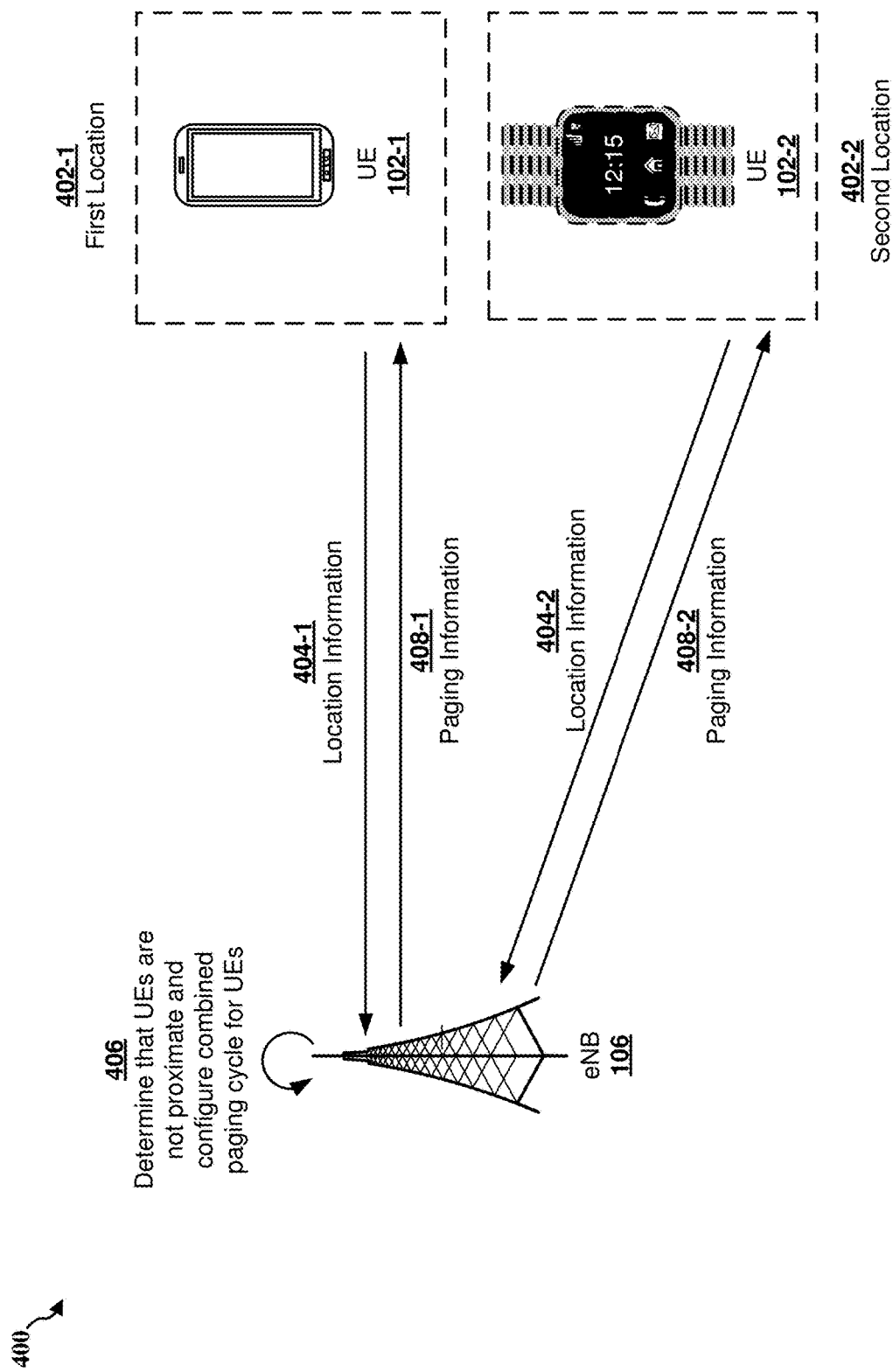
FIGS. 4A and 4B are diagrams illustrating an example system configured to decode a paging message associated with a combined paging cycle.
Figure 4B:
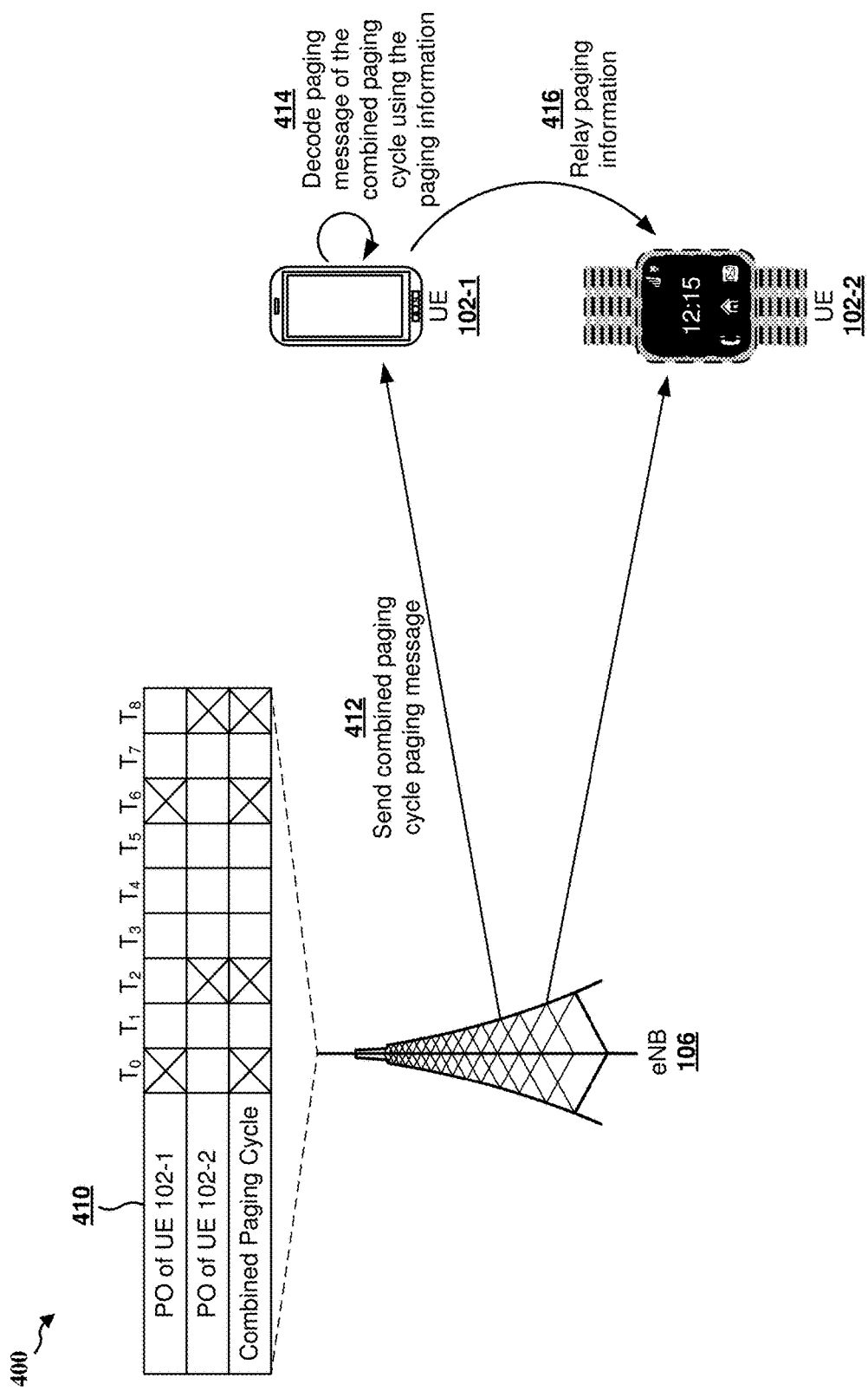

FIGS. 4A and 4B are diagrams illustrating an example system configured to decode a paging message associated with a combined paging cycle. As shown in FIG. 4A, example system 400 may include a UE 102-1 and a UE 102-2 (e.g., each of which may correspond to one or more of the UE 102 of FIG. 1, the UE 206 of FIG. 2, the UE 350 of FIG. 3, and/or the like) and an eNB 106 (e.g., which may correspond to one or more of the eNBs 106, 108 of FIG. 1, the eNBs 204, 208 of FIG. 2, the eNB 310 of FIG. 3, and/or the like).

As shown in FIG. 4A, the UE 102-1 may be located in a first location 402-1 and the UE 102-2 may be located in a second location 402-2. In some aspects, the first location 402-1 and the second location 402-2 may be different locations. For example, the UE 102-1 may be located a threshold distance from the UE 102-2. In this case, the UE 102-1 and the UE 102-2 may lack a communicative connection, such as an LTE device-to-device (D2D) connection, a Wi-Fi direct connection, a Bluetooth connection, and/or the like. In some aspects, the first location 402-1 and the second location 402-2 may be a common location and/or within a threshold proximity. For example, the UE 102-1 may be located within the threshold proximity of the UE 102-2, and may be communicatively connected to the UE 102-2 via an LTE D2D connection, a Wi-Fi direct connection, a Bluetooth connection, and/or the like. In some cases, the first location 402-1 and the second location 402-2 may be termed different locations when the UE 102-1 and the UE 102-2 are within a threshold proximity but lack a communicative connection.

In some aspects, the UE 102-1 may be a smart phone and the UE 102-2 may be a smart watch, a medical device, a tablet, a GPS tracker, a pair of connected eyeglasses, a health monitor, and/or the like. For example, the UE 102-1 may be a multi-antenna smartphone and the UE 102-2 may be a single antenna smart watch. In some aspects, the UE 102-1 may include additional resources relative to UE 102-2, such as one or more additional antennas, additional processing power, additional battery power, and/or the like. In this case, the UE 102-1 may relay paging messages and/or other network traffic between the UE 102-2 and the eNB 106 to reduce a utilization of power resources, processing resources, and/or the like of the UE 102-2.

As shown by reference number 404-1 and 404-2, the UE 102-1 may provide location information 404-1 and the UE 102-1 may provide location information 404-2. The location information 404-1 and 404-2 may be associated with a reference signal time difference (RSTD) measurement performed by the UE 102-1 or the UE 102-2, respectively, of a reference signal provided by the eNB 106 and/or another eNB 106. For example, the UE 102-1 may perform an RSTD measurement of a set of reference signals, and may provide the location information 404-1 to eNB 106 to identify a location of the UE 102-1. In some aspects, the UE 102-1 may provide other information relating to a location, such as a location identifier (e.g., a global positioning system (GPS) coordinate), an indication of whether the UE 102-1 and the UE 102-2 are communicatively connected, and/or the like. In some aspects, one (but not both) of the UE 102-1 or the UE 102-2 may provide location information 404-1 or 404-2. For example, when the UE 102-1 determines that the UE 102-1 and the UE 102-2 are communicatively connected, the UE 102-1 may provide location information 404-1 indicating that the UE 102-1 and the UE 102-2 are within a threshold proximity. In this case, the UE 102-2 may suppress transmission of location information 404-2, thereby reducing a utilization of network resources, power resources, communication resources, and/or the like relative to a situation where the UE 102-2 provides the location information 404-2.

As shown by reference number 406, the eNB 106 may determine that the UEs 102 are not proximate, which may trigger the eNB 106 (i.e., the network) to configure and/or establish a combined paging cycle for the UEs 102. For example, the eNB 106 may determine a schedule for a set of paging messages for the UE 102-1 and the UE 102-2. In some aspects, the eNB 106 may determine a set of paging frames for transmission. In some aspects, the eNB 106 may determine a set of paging occasions of a paging frame to be transmitted. In some aspects, the eNB 106 may generate paging information associated with decoding a paging message of the combined paging cycle. For example, the eNB 106 may generate paging information identifying a schedule of the set of paging messages for the UE 102-1 and the UE 102-2.

As shown by reference numbers 408-1 and 408-2, the UE 102-1 may obtain paging information 408-1 and the UE 102-2 may obtain paging information 408-2 from the eNB 106. In another example, the UE 102-1 may obtain the paging information 408-1 from the UE 102-2, such as information identifying an IMSI or an S-TMSI of the UE 102-2 to enable the UE 102-1 to decode paging messages directed to the UE 102-2. In some aspects, the UE 102-1 may analyze the paging information 408-1 to identify an IMSI, an S-TMSI, and/or the like relating to the UE 102-2; the combined paging cycle; and/or the like. In some aspects, the UE 102-1 may determine a schedule of the combined paging cycle based at least in part on the paging information 408-1. In some aspects, the paging information 408-1 or the paging information 408-2 may be received via an information element (IE) of a non-critical extension of a page container.

As shown in FIG. 4B, and by reference number 410, the eNB 106 may utilize a schedule 410 for transmitting the combined paging cycle. As shown, the combined paging cycle may be scheduled (e.g., by the eNB 106) for time slots that are reserved for a paging occasion of the UE 102-1 (e.g., $T_0$ and $T_6$) and for time slots that are reserved for a paging occasion of the UE 102-2 (e.g., $T_2$ and $T_8$). In some aspects, the eNB 106 may schedule the combined paging cycle using time slots reserved for one of the UE 102-1 or the UE 102-2. In some aspects, the eNB 106 may schedule the combined paging cycle for another set of time slots different from the set of time slots reserved for the UE 102-1 or the UE 102-2.

As shown, the UE 102-1 may receive a paging message 412 of the combined paging cycle established by eNB 106. In some aspects, the UE 102-2 may receive the paging message 412 from eNB 106 based at least in part on eNB 106 providing paging messages of the combined paging cycle. In some aspects, the UE 102-1 may receive the paging message 412 using the paging information 408-1. For example, the UE 102-1 may monitor for the paging message 412 at a particular time slot based at least in part on the paging information 408-1 including information identifying the particular time slot. In some aspects, the UE 102-1 may monitor for the paging message 412 based at least in part on a battery level of the UE 102-1. For example, based at least in part on the battery level of the UE 102-1 satisfying a threshold, the UE 102-1 may monitor for the paging message 412. In contrast, when the battery level of the UE 102-1 does not satisfy the threshold, the UE 102-1 may determine to monitor another paging cycle (e.g., a paging cycle of UE 102-1), which may include a reduced quantity of paging messages relative to the combined paging cycle. In this way, the UE 102-1 reduces a likelihood of exhausting power resources during monitoring for paging messages relative to monitoring for paging messages at all times.

As shown by reference number 414, the UE 102-1 may decode the paging message 412 of the combined paging cycle using the paging information 408-1. For example, the UE 102-1 may decode the paging message 412 and may perform a random access procedure based at least in part on the paging message 412. In this case, the UE 102-1 may decode the paging message 412 using information included in the paging information 408-1, such as decryption information and/or the like. In some aspects, the UE 102-2 may decode the paging message 412 based at least in part on receiving the paging message 412 from eNB 106.

As shown by reference number 416, in some aspects, the UE 102-1 may relay the paging message 412 to the UE 102-2. For example, the UE 102-1 may relay the paging message 412 to the UE 102-2 after decoding the paging message 412 and determining that the paging message 412 is intended for the UE 102-2. In some aspects, the UE 102-1 may relay the paging message 412 to the UE 102-2 using a secure interface. Similarly, as described herein, the UE 102-1 may relay uplink network traffic using a secure interface. In some aspects, the UE 102-1 may relay the paging message 412 before decoding the paging message 412 based at least in part on the paging message 412 being associated with the combined paging cycle. In some aspects, the UE 102-1 may relay the paging message 412 when the UE 102-1 is within a threshold proximity of the UE 102-2. For example, the UE 102-1 may relay the paging message 412 using an LTE D2D connection, a Wi-Fi connection, a Bluetooth connection, and/or the like.

As indicated above, FIGS. 4A and 4B are provided as examples. Other examples are possible and may differ from what was described with regard to FIGS. 4A and 4B.

Figure 5:
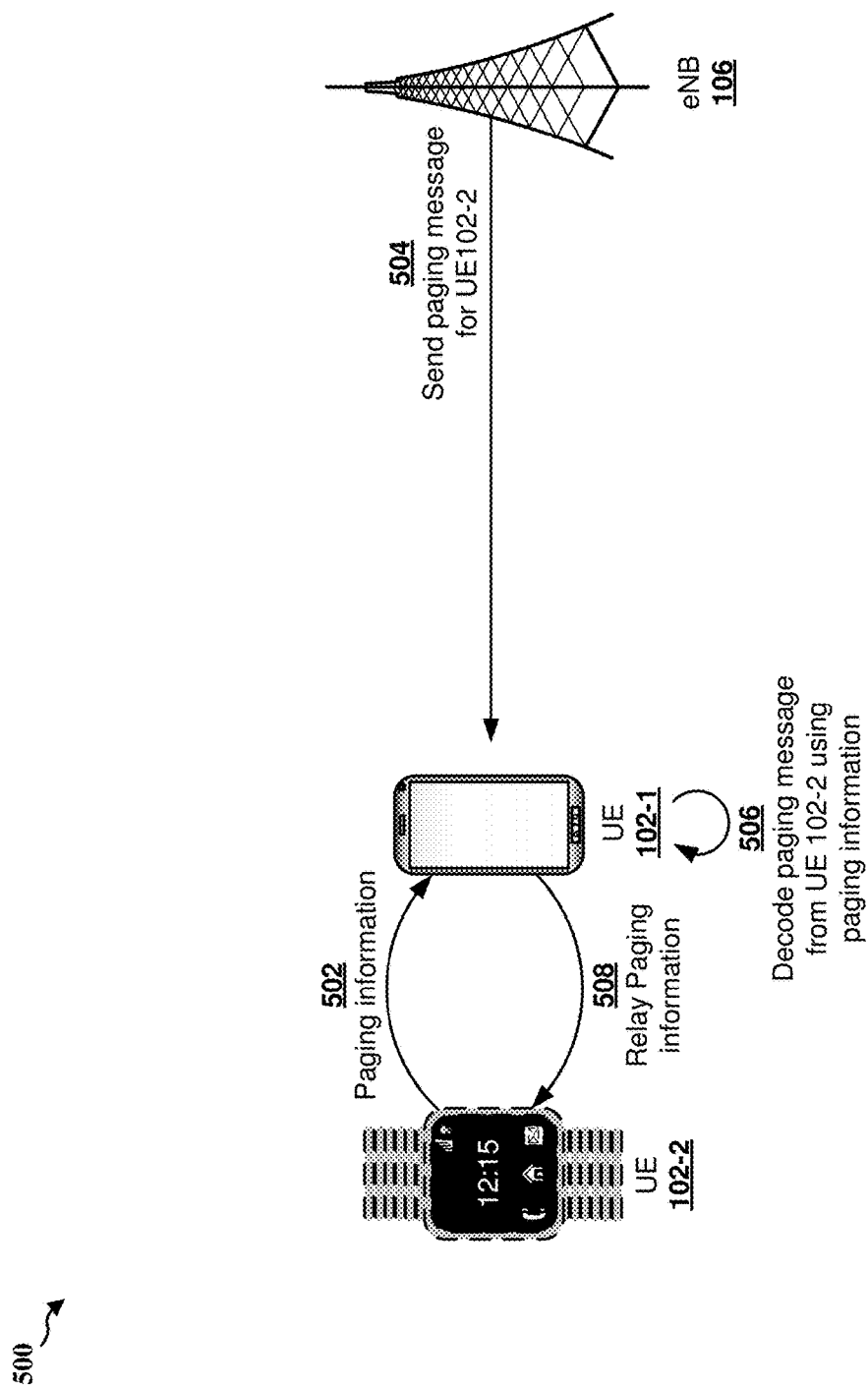
FIG. 5 is a diagram illustrating another example system configured to relay a paging message associated with a combined paging cycle.

FIG. 5 is a diagram illustrating another example system configured to relay a paging message associated with a combined paging cycle. As shown in FIG. 5, example system 500 may include a UE 102-1 and a UE 102-2 (e.g., each of which may correspond to one or more of the UE 102 of FIG. 1, the UE 206 of FIG. 2, the UE 350 of FIG. 3, the UEs 102-1, 102-2 of FIGS. 4A and 4B, and/or the like) and an eNB 106 (e.g., which may correspond to one or more of the eNBs 106, 108 of FIG. 1, the eNBs 204, 208 of FIG. 2, the eNB 310 of FIG. 3, the eNB 106 of FIGS. 4A and 4B, and/or the like).

As shown in FIG. 5, the UE 102-1 may obtain paging information 502 from the UE 102-2. For example, the UE 102-1 may obtain the paging information 502 using an LTE D2D connection, a Wi-Fi connection, a Bluetooth connection, and/or the like when the UE 102-1 is within a threshold proximity of the UE 102-2. In some aspects, the UE 102-1 may obtain the paging information 502 via upper layer traffic (e.g., encrypted upper layer traffic), which may be parsed by the UE 102-1. In some aspects, the paging information 502 may identify a schedule of a paging cycle for the UE 102-2, an S-TMSI of the UE 102-2, and/or the like.

As shown, the UE 102-1 may obtain a paging message 504 from the eNB 106 based at least in part on the eNB 106 transmitting the paging message 504 for the UE 102-2. For example, the UE 102-1 may monitor for paging messages associated with the UE 102-2 using the paging information 502, and may obtain the paging message 504 based at least in part on monitoring for paging messages.

As shown by reference number 506, the UE 102-1 may decode the paging message 504 using the paging information 502. For example, the UE 102-1 may determine contents of the paging message 504 using the paging information 502. In some aspects, the UE 102-1 may refrain from decoding the paging message 504, and may relay the paging message 504 without decoding the paging message 504. In this way, the UE 102-1 may reduce a utilization of processing resources relative to a situation where the UE 102-1 decodes paging messages intended for the UE 102-2.

As shown by reference number 508, the UE 102-1 may relay the paging message 504 to the UE 102-2. For example, the UE 102-1 may transmit the paging message 504 or contents of the paging message 504 to the UE 102-2, such as via an LTE D2D connection, a Wi-Fi direct connection, a Bluetooth connection, and/or the like. In this case, the UE 102-1 enables the UE 102-2 to receive paging messages when the UE 102-2 is unable to detect the paging messages (e.g., based at least in part on having a less sensitive antenna relative to the UE 102-1), when the UE 102-2 lacks battery resources to monitor for paging messages, and/or the like.

As indicated above, FIG. 5 is provided as an example. Other examples are possible and may differ from what was described with regard to FIG. 5.

Figure 6:
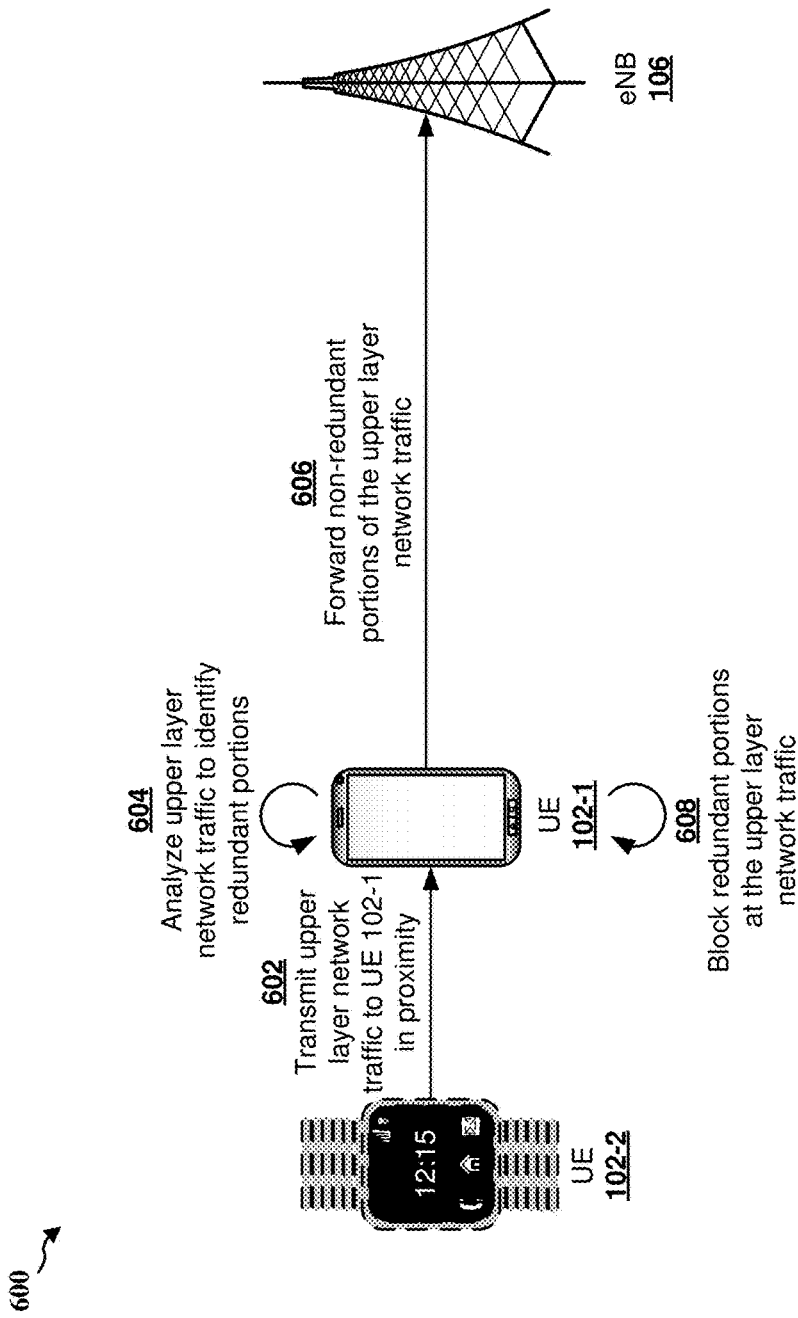
FIG. 6 is a diagram illustrating another example system configured to relay network traffic for a UE.

FIG. 6 is a diagram illustrating another example system configured to relay network traffic for a UE. As shown in FIG. 6, example system 600 may include a UE 102-1 and a UE 102-2 (e.g., each of which may correspond to one or more of the UE 102 of FIG. 1, the UE 206 of FIG. 2, the UE 350 of FIG. 3, the UEs 102-1, 102-2 of FIGS. 4A and 4B, the UEs 102-1, 102-2 of FIG. 5, and/or the like) and an eNB 106 (e.g., which may correspond to one or more of the eNBs 106, 108 of FIG. 1, the eNBs 204, 208 of FIG. 2, the eNB 310 of FIG. 3, the eNB 106 of FIGS. 4A and 4B, the eNB 106 of FIG. 5, and/or the like).

At 602, the UE 102-1 may receive upper layer traffic from UE 102-2 based at least in part on the UE 102-1 being within a threshold proximity of the UE 102-2 (e.g., the UE 102-1 being communicatively connected to the UE 102-2). In some aspects, the UE 102-1 may receive other network traffic, such as a scheduling request (SR), a random access procedure (RACH) message, and/or the like.

At 604, the UE 102-1 may analyze the upper layer network traffic to identify redundant portions of the upper layer network traffic. For example, when the UE 102-1 and the UE 102-2 share a common calendar application account or messaging application account (e.g., common to an entity operating the UE 102-1 and the UE 102-2), the UE 102-1 may determine that a portion of the upper layer network traffic associated with the common calendar application account or messaging application account is redundant, as intended to be directed from the UE 102-2 to the eNB 106 and to the UE 102-1 for storage. In contrast, the UE 102-1 may determine that another portion of the upper layer network traffic associated with another application not common to the UE 102-1 and the UE 102-2 is not redundant (i.e., not intended to be directed from the eNB 106 to UE 102-1 after transmission from UE 102-2 to the eNB 106).

At 606, the UE 102-1 may relay non-redundant portions of the upper layer network traffic. For example, based at least in part on analyzing the upper layer network traffic, the UE 102-1 may determine that a portion of the upper layer network traffic is not intended to be transmitted back from the eNB 106 to the UE 102-1 after being relayed to the eNB 106, and may transmit the portion of upper layer network traffic to the eNB 106. In another example, UE 102-1 may relay network traffic from the eNB 106 to the UE 102-2. In this way, the UE 102-1 enables the UE 102-2 to transmit and/or receive network traffic, such as when the UE 102-2 is unable to directly communicate with the eNB 106, thereby improving network performance and user experience and reducing utilization of power resources of the UE 102-2.

At 608, the UE 102-1 may block redundant portions of the upper layer network traffic. For example, based at least in part on identifying a portion of the upper layer network traffic intended to be directed to UE 102-1 for processing (e.g., for storage with a calendar application, a messaging application, and/or the like). In this way, the UE 102-1 reduces an amount of unnecessary network traffic relative to relaying all network traffic from UE 102-2 to eNB 106.

As indicated above, FIG. 6 is provided as an example. Other examples are possible and may differ from what was described with regard to FIG. 6.

Figure 7:
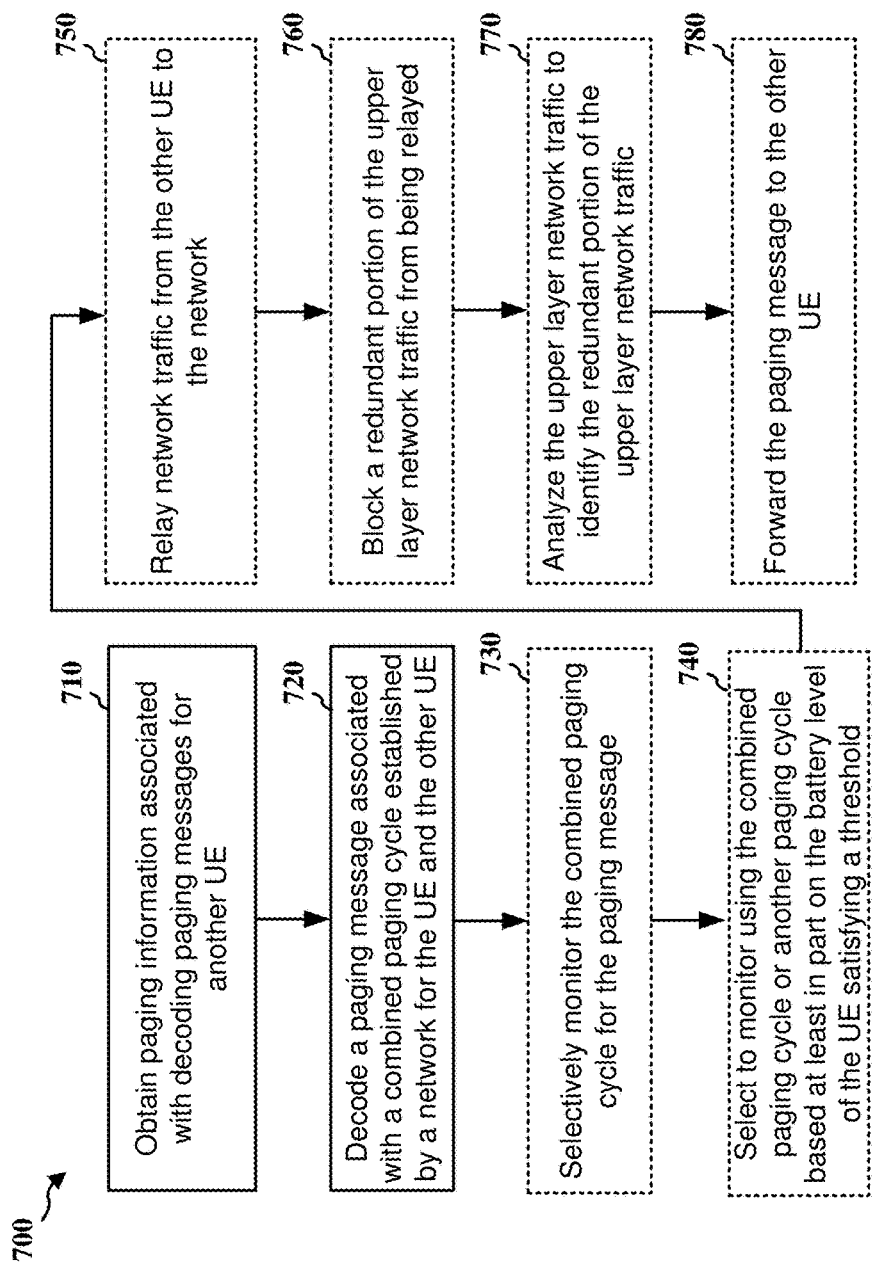
FIG. 7 is a flow chart of a method of wireless communication.

FIG. 7 is a flow chart of a method of wireless communication 700. The method 700 may be performed by a UE (e.g., which may correspond to one or more of the UE 102 of FIG. 1, the UE 206 of FIG. 2, the UE 350 of FIG. 3, the apparatus 802/802', and/or the like).

At 710, the UE obtains paging information associated with decoding paging messages for another UE (block 710). For example, the UE (i.e., a first UE) may obtain paging information associated with decoding paging messages for another UE (i.e., a second UE). In some aspects, the first UE and the second UE may share a mobile directory number (MDN). In some aspects, the first UE and the second UE are connected by an LTE D2D connection, a Wi-Fi direct connection, a Bluetooth connection, and/or the like. In some aspects, the first UE may have a greater number of antennas than the second UE. In some aspects, the first UE may be a handheld device and the second UE may be a wearable device.

In some aspects, the first UE may receive the paging information via an information element (IE) of a non-critical extension of a page container. For example, the first UE may receive the paging information via an IE transmitted by an eNB.

At 720, the UE decodes a paging message associated with a combined paging cycle established by a network for the UE and the other UE (block 720). For example, the UE (i.e., the first UE) may decode the paging message associated with the combined paging cycle established by the network for the UE and the other UE (i.e., the second UE). In some aspects, the paging message is received by the first UE and intended for the second UE. In this case, the first UE may forward the paging message to the second UE.

In some aspects, establishment of the combined paging cycle may be triggered based at least in part on information identifying locations of the first UE and the second UE. For example, based at least in part on the first UE transmitting information identifying a location of the first UE to an eNB, the eNB may establish the combined paging cycle and may provide the paging information to identify the combined paging cycle to the first UE.

In some aspects, the first UE may selectively monitor the combined paging cycle for the paging message. In some aspects, when the battery level of the first UE satisfies a threshold, the first UE may select to monitor using the combined paging cycle or another paging cycle established by the network for the first UE based at least in part on the battery level of the first UE satisfying a threshold.

In some aspects, the first UE may relay network traffic from the second UE to the network. For example, the first UE may receive network traffic from the second UE, and may direct the network traffic to an eNB of the network. In some aspects, when the network traffic includes upper layer network traffic, the first UE may block a redundant portion of the upper layer network traffic from being relayed. In some aspects, the first UE may analyze the upper layer network traffic to identify the redundant portion of the upper layer network traffic. In some aspects, the first UE may relay a scheduling request (SR) message or a random access procedure (RACH) message.

At 730, in some aspects, the UE selectively monitors the combined paging cycle for the paging message (block 730). For example, the UE (i.e., the first UE) may selectively monitor the combined paging cycle for the paging message. In some aspects, the UE may select to monitor the combined paging cycle for the paging message, and may receive the paging message based on monitoring the combined paging cycle. For example, the UE may utilize the paging information to monitor the combined paging cycle and to receive the paging message. In some aspects, the UE may select to not monitor the combined paging cycle. For example, based on a battery level failing to satisfy a threshold, the UE may determine not to monitor the combined paging cycle, thereby reducing a likelihood of the UE exhausting battery resources.

At 740, in some aspects, the UE selects to monitor using the combined paging cycle or another paging cycle based at least in part on the battery level of the UE satisfying a threshold (block 740). For example, the UE (i.e., the first UE) may select to monitor using the combined paging cycle or another paging cycle based at least in part on the battery level of the UE satisfying the threshold. In some aspects, the UE may determine the battery level. For example, the UE may determine that the battery level of the UE satisfies a threshold, and the UE may select to monitor using the combined paging cycle or another paging cycle based on determining that the battery level satisfies the threshold. In this way, the UE reduces a likelihood of exhausting battery resources relative to selecting to monitor a paging cycle without determining that a threshold level of battery resources is available. In some aspects, the other paging cycle may be established for the network for the UE. For example, when battery resources satisfy a threshold associated with the battery resources being insufficient for monitoring the combined paging cycle, the UE may determine to monitor the other paging cycle established for the UE (and not for the other UE).

At 750, in some aspects, the UE relays network traffic from the other UE to the network (block 750). For example, the UE (i.e., the first UE) may relay the network traffic from the other UE (i.e., the second UE) to the network. In some aspects, the UE may relay upper layer network traffic, such as network traffic associated with an application and/or the like. Additionally, or alternatively, the UE may relay control network traffic, such as a scheduling request message or a random access procedure message.

At 760, in some aspects, the UE blocks a redundant portion of the upper layer network traffic from being relayed (block 760). For example, the UE (i.e., the first UE) may block the redundant portion of the upper layer network traffic from being relayed. In some aspects, the UE may block the redundant portion of the upper layer network traffic based on determining that the network traffic includes upper layer network traffic. In some aspects, the UE may block the redundant portion of the upper layer network traffic based on determining that the upper layer network traffic is redundant. In this way, the UE reduces an amount of network traffic that is relayed, thereby improving network performance relative to relaying redundant network traffic.

At 770, in some aspects, the UE analyzes the upper layer network traffic to identify the redundant portion of the upper layer network traffic (block 770). For example, the UE (i.e., the first UE) may analyze the upper layer network traffic to identify the redundant portion of the upper layer network traffic. In some aspects, the UE may analyze the upper layer network traffic to identify a destination of the upper layer network traffic. For example, when the UE determines that the upper layer network traffic is directed to the UE via the network, the UE may determine that upper layer network traffic that is directed to the network to be relayed back to the UE is redundant network traffic. Additionally, or alternatively, the UE may determine an application associated with the upper layer network traffic. For example, the UE may determine that the upper layer network traffic is associated with a shared calendar, a shared email account, or the like shared by the UE and the other UE (i.e., the second UE). In this case, the UE may determine that the upper layer network traffic is redundant network traffic.

At 780, in some aspects, the UE forwards the paging message to the other UE (block 780). For example, the UE (i.e., the first UE) may forward the paging message to the other UE (i.e., the second UE). In some aspects, the paging message is received by the UE and intended for the other UE. For example, the UE may receive the paging message, may determine that the paging message is intended for the other UE, and may forward the paging message to the other UE based on determining that the paging message is intended for the other UE.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
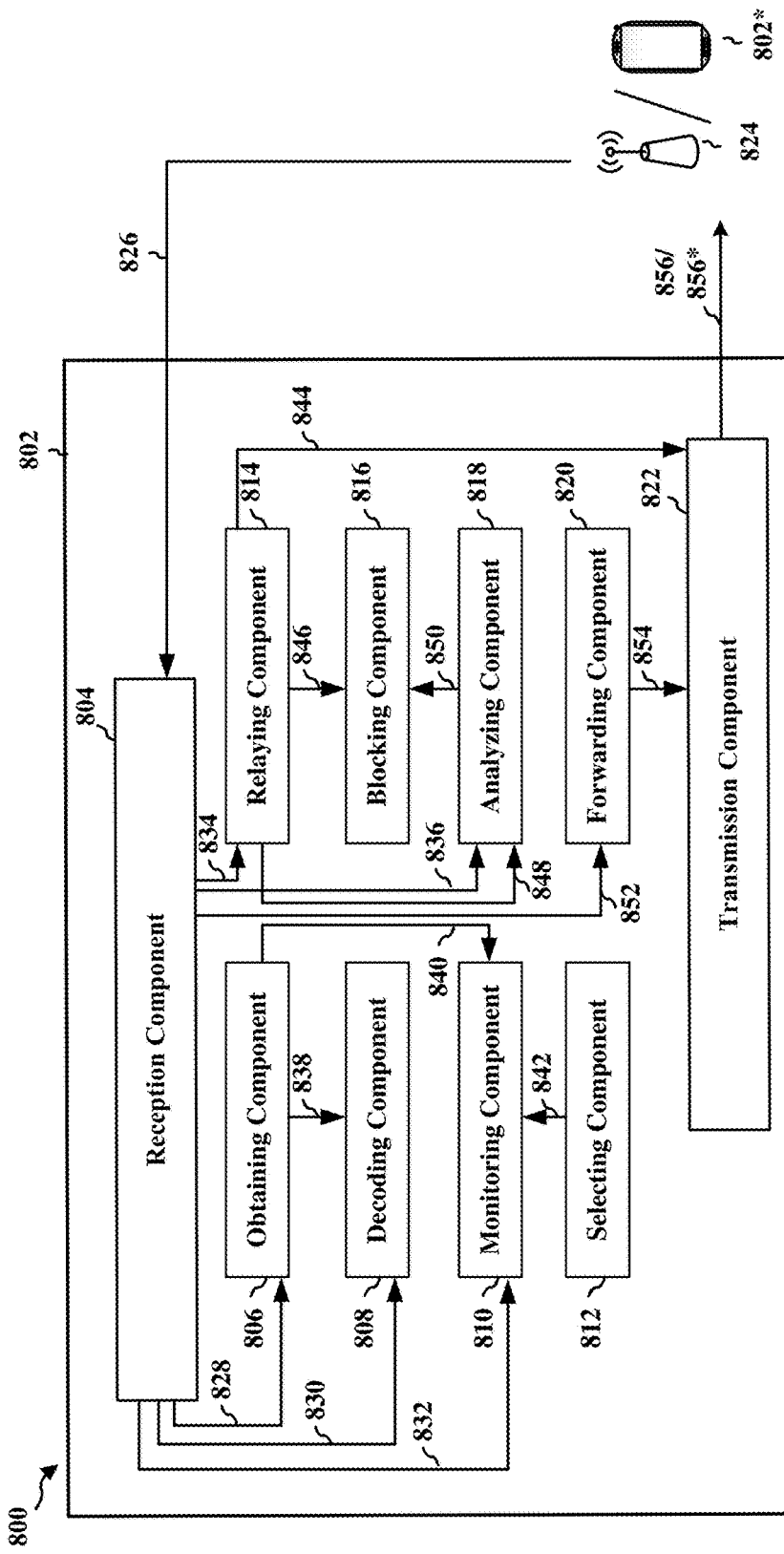
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a UE (e.g., which may correspond to one or more of the UE 102 of FIG. 1, the UE 206 of FIG. 2, the UE 350 of FIG. 3, the UEs 102-1, 102-2 of FIGS. 4A and 4B, the UEs 102-1, 102-2, of FIG. 5, the UEs 102-1, 102-2 of FIG. 6, and/or the like). The apparatus 802 includes a reception component 804, an obtaining component 806, a decoding component 808, a monitoring component 810, a selecting component 812, a relaying component 814, a blocking component 816, an analyzing component 818, a forwarding component 820, and a transmission component 822. The apparatus 802 may communicate with an eNB 824.

The reception component 804 may receive data 826 from eNB 824, and the data 826 may include paging information associated with decoding paging messages for the other apparatus 802*, a paging message, upper layer network traffic, and/or the like. In some aspects, the reception component 804 may receive the data 826 from the other apparatus 802*, and the data 826 may include network traffic for relaying to the eNB 824. The reception component 804 may provide data 828 to obtaining component 806, data 830 to decoding component 808, data 832 to monitoring component 810, data 834 to relaying component 814, data 836 to analyzing component 818, and/or the like.

The obtaining component 806 may receive the data 828 from reception component, and the data 828 may include paging information associated with decoding paging messages for the other apparatus 802*. The paging information may identify a combined paging cycle established by eNB 824 for the apparatus 802 and the other apparatus 802*. The obtaining component 806 may provide data 838 to the decoding component 808 and data 840 to the monitoring component 810.

The decoding component 808 may receive the data 838 from the obtaining component 806, and the data 838 may include the paging information for use in decoding a paging message. The decoding component 808 may receive the data 830 from the reception component 804, and the data 830 may include the paging message associated with a combined paging cycle established by eNB 824 for the apparatus 802 and the other apparatus 802*. For example, the decoding component 808 may decode the paging message using the paging information. The decoding component 808 may provide data 842 to relaying component 814.

The monitoring component 810 may receive the data 832 from the reception component 804, and the data 832 may include a set of signaling messages from eNB 824; may receive the data 840 from the obtaining component 806, and the data 840 may include the paging information; and may receive data 842 from the selecting component 812 and the data 842 may indicate whether the apparatus 802 is to monitor for the set of signaling messages. For example, the monitoring component 810 may monitor the set of signaling messages to detect the paging message of the combined paging cycle using the paging information and based at least in part on the selecting component 812 selecting that the apparatus 802 is to monitor for the set of signaling messages.

The selecting component 812 may provide the data 842 to the monitoring component 810 to cause the apparatus 802 to monitor the set of signaling messages to detect the paging message of the combined paging cycle. For example, the selecting component 812 may determine that a battery level of the apparatus 802 satisfies a threshold and may select to monitor the combined paging cycle or another paging cycle based at least in part on the battery level of the apparatus 802 satisfying the threshold. In this case, the other paging cycle may be established by the eNB 824 for the apparatus 802.

The relaying component 814 may receive the data 834 from reception component 804, and the data 834 may include network traffic, a scheduling request, a random access procedure (RACH) message, and/or the like. For example, the relaying component 814 may receive upper level network traffic from the other apparatus 802* to be relayed to eNB 824. Additionally, or alternatively, the relaying component 814 may receive the scheduling request or the random access procedure message from the other apparatus 802* to be relayed to eNB 824. The relaying component 814 may provide data 844 to the transmission component 822, data 846 to blocking component 816, data 848 to analyzing component 818, and/or the like.

The blocking component 816 may receive the data 846 from the relaying component 814 and the data 846 may include upper layer network traffic; and may receive data 850 from the analyzing component 818, and the data 850 may identify a redundant portion of the upper layer network traffic. For example, the blocking component 816 may receive the upper layer network traffic, and may block a redundant portion of the upper layer network traffic from being relayed to the eNB 824.

The analyzing component 818 may receive data 848 from relaying component 814, and the data 848 may include upper layer network traffic. For example, the analyzing component 818 may receive the upper layer network traffic and may identify a redundant portion of the upper layer network traffic. The analyzing component 818 may provide the data 850 to the blocking component 816 to identify the redundant portion of the upper layer network traffic for blocking.

The forwarding component 820 may receive data 852 from the reception component 804, and the data 852 may include a paging message received by apparatus 802 and intended for the other apparatus 802*. For example, the forwarding component 820 may receive the paging message, and may forward the paging message to the other apparatus 802*. The forwarding component 820 may provide data 854 to the transmission component 822.

The transmission component 822 may receive the data 844 from the relaying component 814 and the data 844 may include network traffic for transmission to eNB 824 or to the other apparatus 802*; and may receive the data 854 from the forwarding component 820 and the data 854 may include a paging message intended for the other apparatus 802*. For example, the transmission component 822 may transmit network traffic received by the apparatus 802 from the other apparatus 802* to eNB 824 and/or network traffic received from eNB 824 to the other apparatus 802*. In some aspects, a portion of the network traffic, such as a redundant portion of the upper layer network traffic, may be blocked. Additionally, or alternatively, the transmission component 822 may transmit a paging message intended for the other apparatus 802* to the other apparatus 802*. The transmission component 822 may provide data 856 to the eNB 824 and data 856* to the other apparatus 802*.

The apparatus 802 may include additional components that perform each of the blocks of the algorithm in the aforementioned flow charts of FIG. 8. As such, each block in the aforementioned flow charts of FIG. 8 may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
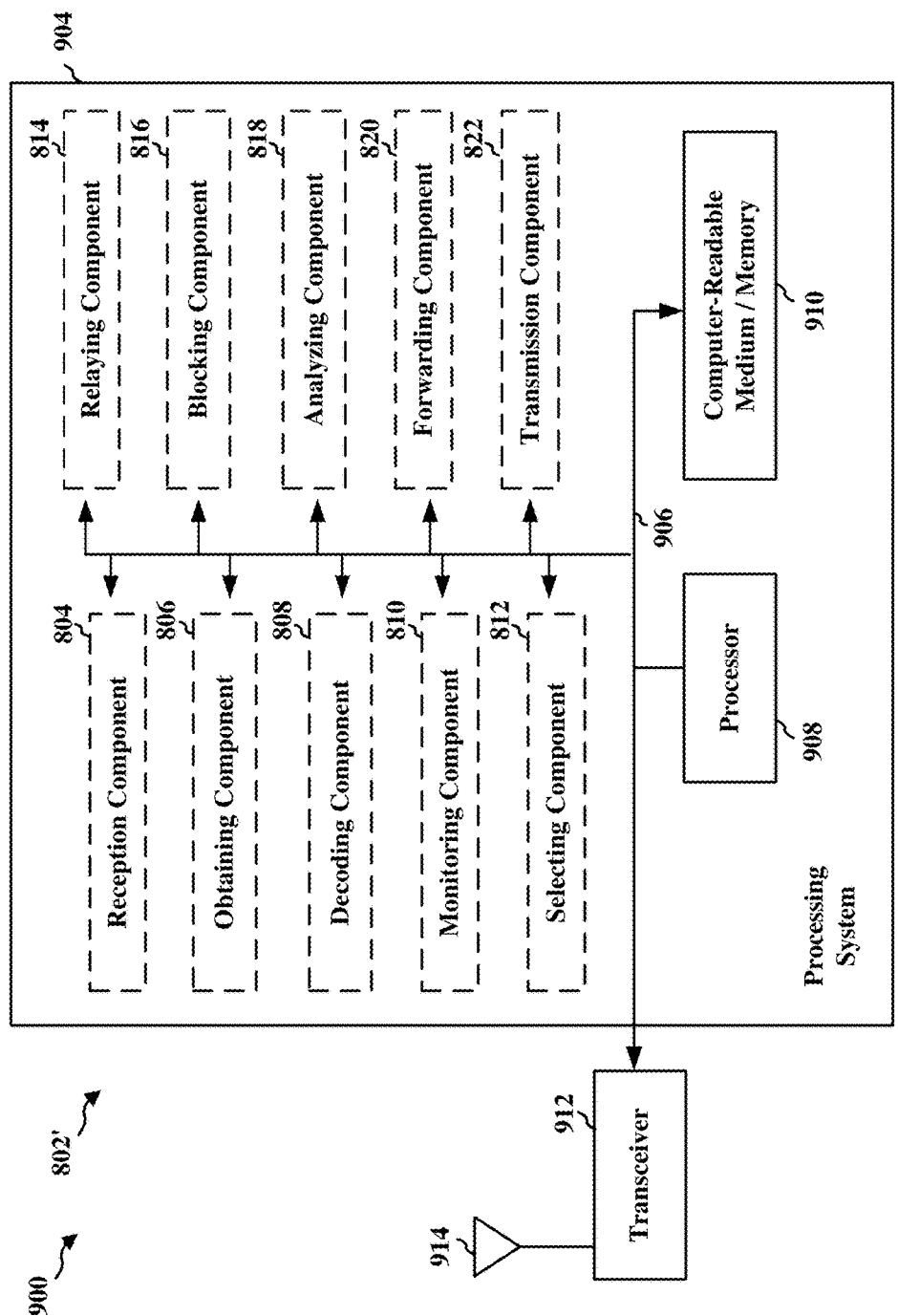
FIG. 9 is a diagram illustrating an example of a hardware implementation for an apparatus employing a processing system.

FIG. 9 is a diagram 900 illustrating an example of a hardware implementation for an apparatus 802' employing a processing system 904. The apparatus 802' may be a UE (e.g., which may correspond to one or more of the UE 102 of FIG. 1, the UE 206 of FIG. 2, the UE 350 of FIG. 3, the UEs 102-1, 102-2 of FIGS. 4A and 4B, the UEs 102-1, 102-2 of FIG. 5, the UEs 102-1, 102-2 of FIG. 6, the apparatuses 802, 802* of FIG. 8, and/or the like).

In some aspects, the processing system 904 may be implemented with a bus architecture, represented generally by the bus 906. The bus 906 may include any number of interconnecting buses and bridges depending on the specific application of the processing system 904 and the overall design constraints. The bus 906 links together various circuits including one or more processors and/or hardware modules, represented by the processor 908, the components 804, 806, 808, 810, 812, 814, 816, 818, 820, and 822, and the computer-readable medium/memory 910. The bus 906 may also link various other circuits such as timing sources, peripherals, voltage regulators, and power management circuits, which are well known in the art, and therefore, will not be described any further.

The processing system 904 may be coupled to a transceiver 912. The transceiver 912 is coupled to one or more antennas 914. The transceiver 912 provides a means for communicating with various other apparatus over a transmission medium. The transceiver 912 receives a signal from the one or more antennas 914, extracts information from the received signal, and provides the extracted information to the processing system 904, specifically the reception component 804. In addition, the transceiver 912 receives information from the processing system 904, specifically the transmission component 822, and based at least in part on the received information, generates a signal to be applied to the one or more antennas 914. The processing system 904 includes a processor 908 coupled to a computer-readable medium/memory 910. The processor 908 is responsible for general processing, including the execution of software stored on the computer-readable medium/memory 910. The software, when executed by the processor 908, causes the processing system 904 to perform the various functions described supra for any particular apparatus. The computer-readable medium/memory 910 may also be used for storing data that is manipulated by the processor 908 when executing software. The processing system further includes at least one of the components 804, 806, 808, 810, 812, 814, 816, 818, 820, and/or 822. The components may be software components running in the processor 908, resident/stored in the computer readable medium/memory 910, one or more hardware modules coupled to the processor 908, or some combination thereof. The processing system 904 may be a component of the UE 350 and may include the memory 360 and/or at least one of the TX processor 368, the RX processor 356, and the controller/processor 359.

In one configuration, the apparatus 802/802' for wireless communication includes means for obtaining paging information associated with decoding paging messages for another apparatus; means for decoding a paging message associated with a combined paging cycle; means for selectively monitoring the combined paging cycle for the paging message; means for selecting to monitor using the combined paging cycle or another paging cycle based at least in part on a battery level of the apparatus satisfying the threshold;

means for relaying network traffic from the other apparatus to a network; means for blocking a redundant portion of upper layer network traffic from being relayed; means for analyzing the upper layer network traffic to identify the redundant portion of the upper layer network traffic; means for relaying a scheduling request message or a random access procedure message; and/or means for forwarding the paging message to the other apparatus. The aforementioned means may be one or more of the aforementioned modules of the apparatus 802 and/or the processing system 904 of the apparatus 802' configured to perform the functions recited by the aforementioned means. As described supra, the processing system 904 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication, comprising:
   obtaining, by a first user equipment (UE), paging information associated with decoding paging messages for a second UE,
   wherein the paging information identifies a combined paging cycle established by a network for the first UE and the second UE, and
   wherein the combined paging cycle is scheduled to include a first time slot reserved for a paging occasion of the first UE and a second time slot reserved for a paging occasion of the second UE; and
   decoding, by the first UE, a paging message for the second UE and associated with the combined paging cycle,
   wherein the paging message is included in the paging messages.

2. The method of claim 1, wherein the first UE and the second UE share a mobile directory number.

3. The method of claim 1, wherein the first UE and the second UE are connected by at least one of:
   a long term evolution (LTE) device-to-device (D2D) connection,
   a Wi-Fi direct connection, or
   a Bluetooth connection.

4. The method of claim 1, wherein the paging information is received via an information element of a non-critical extension of a page container.

5. The method of claim 1, wherein establishment of the combined paging cycle is triggered based at least in part on information identifying locations of the first UE and the second UE.

6. The method of claim 1, further comprising:
   selectively monitoring the combined paging cycle for the paging message.

7. The method of claim 1, wherein a battery level of the first UE satisfies a threshold; and
   wherein the method further comprises:
      selecting to monitor using the combined paging cycle or another paging cycle based at least in part on the battery level of the first UE satisfying the threshold, the other paging cycle being established by the network for the first UE.

8. The method of claim 1, further comprising:
   relaying network traffic from the second UE to the network.

9. The method of claim 8, wherein the network traffic includes upper layer network traffic; and
   wherein the method further comprises:
      blocking a redundant portion of the upper layer network traffic from being relayed.

10. The method of claim 9, further comprising:
    analyzing the upper layer network traffic to identify the redundant portion of the upper layer network traffic.

11. The method of claim 8, wherein relaying the network traffic comprises:
    relaying a scheduling request (SR) message or a random access procedure (RACH) message.

12. The method of claim 1, wherein the paging message is received by the first UE and intended for the second UE; and
    wherein the method further comprises:
       forwarding the paging message to the second UE.

13. The method of claim 1, wherein the first UE has a greater number of antennas than the second UE.

14. The method of claim 1, wherein the first UE is a handheld device and the second UE is a wearable device.

15. A device for wireless communication, comprising:
    memory; and
    one or more processors coupled to the memory, the memory and the one or more processors configured to:
       obtain paging information associated with decoding paging messages for another device, wherein the paging information identifies a combined paging cycle established by a network for the device and the other device, and
wherein the combined paging cycle is scheduled to include a first time slot reserved for a paging occasion of the device and a second time slot reserved for a paging occasion of the other device; and
decode a paging message for the other device and associated with the combined paging cycle,
wherein the paging message is included in the paging messages.

16. The device of claim 15, wherein the device and the other device share a mobile directory number.

17. The device of claim 15, wherein the device and the other device are connected by at least one of:
a long term evolution (LTE) device-to-device (D2D) connection,
a Wi-Fi direct connection, or
a Bluetooth connection.

18. The device of claim 15, wherein the paging information is received via an information element of a non-critical extension of a page container.

19. The device of claim 15, wherein establishment of the combined paging cycle is triggered based at least in part on information identifying locations of the device and the other device.

20. The device of claim 15, wherein the one or more processors are further configured to:
selectively monitor the combined paging cycle for the paging message.

21. The device of claim 15, wherein a battery level of the device satisfies a threshold; and
wherein the one or more processors are further configured to:
select to monitor using the combined paging cycle or another paging cycle based at least in part on the battery level of the device satisfying the threshold, the other paging cycle being established by the network for the device.

22. The device of claim 15, wherein the one or more processors are further configured to:
relay network traffic from the other device to the network.

23. The device of claim 22, wherein the network traffic includes upper layer network traffic; and
wherein the one or more processors are further configured to:
block a redundant portion of the upper layer network traffic from being relayed.

24. The device of claim 23, wherein the one or more processors are further configured to:
analyze the upper layer network traffic to identify the redundant portion of the upper layer network traffic.

25. An apparatus for wireless communication, comprising:
means for obtaining paging information associated with decoding paging messages for another apparatus,
wherein the paging information identifies a combined paging cycle established by a network for the apparatus and the other apparatus, and
wherein the combined paging cycle is scheduled to include a first time slot reserved for a paging occasion of the apparatus and a second time slot reserved for a paging occasion of the other apparatus; and
means for decoding a paging message for the other apparatus and associated with the combined paging cycle,
wherein the paging message is included in the paging messages.

26. The apparatus of claim 25, wherein the apparatus and the other apparatus share a mobile directory number.

27. The apparatus of claim 25, wherein the apparatus and the other apparatus are connected by at least one of:
a long term evolution (LTE) device-to-device (D2D) connection,
a Wi-Fi direct connection, or
a Bluetooth connection.

28. A non-transitory computer-readable medium storing instructions for wireless communication, the instructions comprising:
one or more instructions that, when executed by one or more processors of a device, cause the one or more processors to:
obtain paging information associated with decoding paging messages for another device,
wherein the paging information identifies a combined paging cycle established by a network for the device and the other device, and
wherein the combined paging cycle is scheduled to include a first time slot reserved for a paging occasion of the device and a second time slot reserved for a paging occasion of the other device; and
decode a paging message for the other device and associated with the combined paging cycle,
wherein the paging message is included in the paging messages.

29. The non-transitory computer-readable medium of claim 28, wherein the device and the other device share a mobile directory number.

30. The non-transitory computer-readable medium of claim 28, wherein the device and the other device are connected by at least one of:
a long term evolution (LTE) device-to-device (D2D) connection,
a Wi-Fi direct connection, or
a Bluetooth connection.

* * * * *